(12) United States Patent
Shibayama

(10) Patent No.: US 11,703,203 B2
(45) Date of Patent: Jul. 18, 2023

(54) LAMP UNIT

(71) Applicant: SUZUKI MOTOR CORPORATION, Hamamatsu (JP)

(72) Inventor: Takuya Shibayama, Hamamatsu (JP)

(73) Assignee: SUZUKI MOTOR CORPORATION, Hamamatsu (JP)

(\*) Notice: Subject to any disclaimer, the term of this patent is extended or adjusted under 35 U.S.C. 154(b) by 43 days.

(21) Appl. No.: 17/487,795

(22) Filed: Sep. 28, 2021

(65) Prior Publication Data

US 2022/0128212 A1 Apr. 28, 2022

(30) Foreign Application Priority Data

Oct. 23, 2020 (JP) ................. 2020-177972

(51) Int. Cl.
| | |
|---|---|
| F21S 43/14 | (2018.01) |
| F21S 43/20 | (2018.01) |
| F21W 107/17 | (2018.01) |
| F21W 103/10 | (2018.01) |
| F21W 103/20 | (2018.01) |

(52) U.S. Cl.
CPC .............. F21S 43/26 (2018.01); F21S 43/14 (2018.01); *F21W 2103/10* (2018.01); *F21W 2103/20* (2018.01); *F21W 2107/17* (2018.01)

(58) Field of Classification Search
CPC ...... F21S 43/14; F21S 43/26; F21W 2103/10; F21W 2103/20; F21V 5/045; F21V 5/007; F21V 5/008
See application file for complete search history.

(56) References Cited

U.S. PATENT DOCUMENTS

| | | | | |
|---|---|---|---|---|
| 2001/0008486 | A1* | 7/2001 | Futami ................. | F21S 41/334 362/540 |
| 2002/0105801 | A1* | 8/2002 | Martineau ............. | F21V 5/045 362/240 |
| 2008/0043465 | A1* | 2/2008 | Chou .................... | F21V 5/007 257/E33.073 |
| 2014/0071674 | A1* | 3/2014 | Tsai ..................... | G02B 19/0066 362/335 |
| 2016/0363288 | A1* | 12/2016 | McKendry ............ | F21V 5/007 |
| 2016/0363747 | A1* | 12/2016 | Krijn .................. | G02B 19/0066 |
| 2017/0292682 | A1* | 10/2017 | Sepkhanov .......... | G02B 3/0068 |

FOREIGN PATENT DOCUMENTS

JP 2017-59411 A 3/2017

\* cited by examiner

*Primary Examiner* — Julie A Bannan
(74) *Attorney, Agent, or Firm* — Stein IP, LLC

(57) ABSTRACT

A lamp unit in which an opening of a unit case is covered with an outer lens is provided. The lamp unit includes a first inner lens provided inside the outer lens, a second inner lens provided inside the outer lens, a first light source facing an incident surface of the first inner lens, and a second light source facing an incident surface of the second inner lens. A space inside the first inner lens and a space inside the second inner lens are continuous. At least a part of the incident surface of the second inner lens is disposed in an irradiation range of the first light source.

6 Claims, 6 Drawing Sheets

LAMP UNIT

CROSS-REFERENCE TO RELATED APPLICATIONS

The disclosure of Japanese Patent Application No. 2020-177972 filed on Oct. 23, 2020, including specification, drawings and claims is incorporated herein by reference in its entirety.

BACKGROUND

The present invention relates to a lamp unit.

As a lamp unit, there is known a lamp unit in which a plurality of lamps are accommodated inside an outer lens covering an opening of a unit case (for example, see Patent Literature 1). The lamp unit described in Patent Literature 1 is provided with a turn signal lamp and a position lamp as a plurality of lamps. The turn signal lamp and the position lamp are installed adjacent to each other, and the inner side of the outer lens is further partitioned by an inner lens of each lamp. A light source is installed inside each inner lens, and irradiation light from each light source is emitted to the outside through the inner lens and the outer lens.
Patent Literature 1: JP-A-2017-059411

SUMMARY

According to one advantageous aspect of the invention, there is provided a lamp unit according to an aspect of the present invention in which an opening of a unit case is covered with an outer lens includes: a first inner lens provided inside the outer lens; a second inner lens provided inside the outer lens; a first light source facing an incident surface of the first inner lens; and a second light source facing an incident surface of the second inner lens, in which a space inside the first inner lens and a space inside the second inner lens are continuous, and at least a part of the incident surface of the second inner lens is disposed in an irradiation range of the first light source.

DETAILED DESCRIPTION OF EXEMPLIFIED EMBODIMENTS

When a small lamp is used for the lamp unit described in Patent Literature 1, an irradiation range of the irradiation light from each lamp becomes narrow, and sufficient visibility cannot be obtained. Therefore, in order to improve the visibility of each lamp, it is necessary to prepare a large lamp, and there is a problem that the lamp unit is increased in size.

The present invention has been made in view of the above point, and an object thereof is to provide a lamp unit capable of obtaining sufficient visibility while achieving compactness.

In a lamp unit according to an aspect of the present invention, an opening of a unit case is covered with an outer lens. First and second inner lenses are provided inside the outer lens, a first light source faces an incident surface of the first inner lens, and a second light source faces an incident surface of the second inner lens. A space inside the first inner lens and a space inside the second inner lens are continuous, and at least a part of an incident surface of the second inner lens is disposed in an irradiation range of the first light source. An irradiation light from the first light source is incident on the incident surface of the first inner lens, and the irradiation light from the first light source is also incident on the incident surface of the second inner lens facing the second light source through the space inside the second inner lens. Since the first and second inner lenses are illuminated from the inside by the first light source, sufficient visibility is ensured even if the first light source is small in size. Even if a size of the first inner lens is reduced, the visibility is ensured by the second inner lens, and the lamp unit can be compactly formed.

Figure 1:
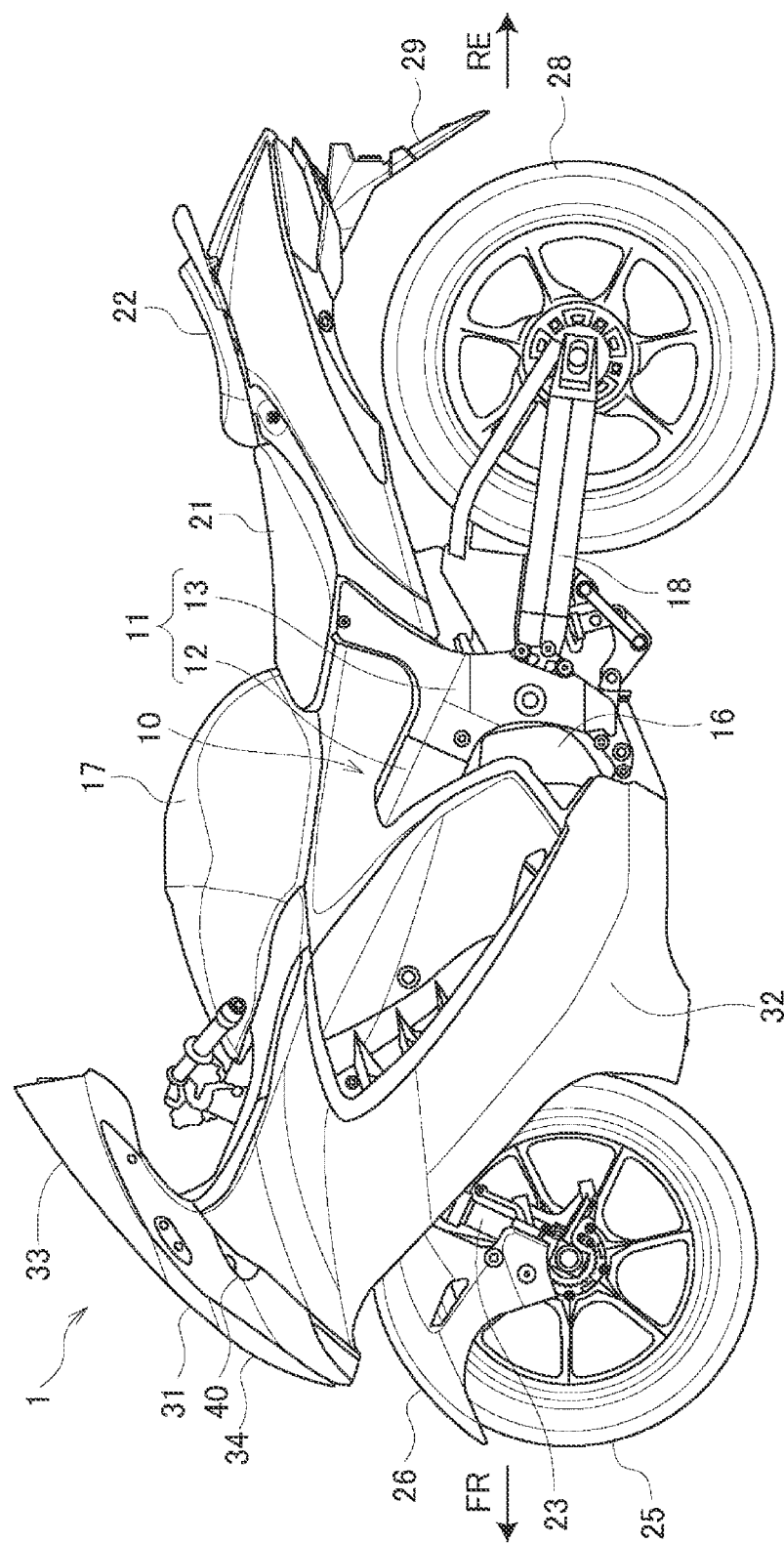
FIG. 1 is a left side view of a straddle-type vehicle according to the present embodiment.

Hereinafter, the present embodiment will be described in detail with reference to the accompanying drawings. FIG. 1 is a left side view of a straddle-type vehicle according to the present embodiment. Further, in the following drawings, an arrow FR indicates a vehicle front side, an arrow RE indicates a vehicle rear side, an arrow L indicates a vehicle left side, and an arrow R indicates a vehicle right side.

As illustrated in FIG. 1, a straddle-type vehicle 1 includes various types of components such as an engine 16 and an electrical system that are mounted on a twin spar-type vehicle body frame 10 formed by aluminum casting. The vehicle body frame 10 includes a pair of main frames 11 that are branched off from a head pipe (not illustrated) to left and right sides and extend rearward, and a pair of down frames (not illustrated) that are branched off from the head pipe to the left and right sides and extend downward. A rear portion of the engine 16 is supported by the pair of main frames 11, and a front portion of the engine 16 is supported by the pair of down frames. By supporting the engine 16 with the vehicle body frame 10, rigidity of the entire vehicle is ensured.

Front side portions of the pair of main frames 11 are tank rails 12 positioned above the engine 16, and a fuel tank 17 is supported by the tank rails 12. Rear side portions of the main frames 11 are body frames 13 positioned behind the engine 16, and swing arms 18 are supported at substantially intermediate positions of the body frames 13 in an upper-lower direction so as to be steered. Seat rails (not illustrated) and a back stay extend rearward from upper portions of the body frames 13. A rider seat 21 and a pillion seat 22 are supported on the seat rails behind the fuel tank 17.

A pair of front forks 23 are supported on the head pipe via a steering shaft (not illustrated) so as to be steered. A front wheel 25 is rotatably supported by lower portions of the front forks 23, and an upper portion of the front wheel 25 is covered by a front fender 26. The swing arms 18 extend rearward from the body frames 13. A rear wheel 28 is rotatably supported at rear ends of the swing arms 18, and an upper side of the rear wheel 28 is covered with a rear fender 29. The engine 16 is coupled to the rear wheel 28 via a chain drive type transmission mechanism, and power from the engine 16 is transmitted to the rear wheel 28 via the transmission mechanism.

The straddle-type vehicle 1 is covered with various covers serving as a vehicle body exterior. For example, a front surface side of a vehicle front portion is covered with a front cowl 31, and side surface sides of the vehicle front portion are covered with a pair of side cowls 32. A screen 33 is provided on an upper portion of the front cowl 31, and a headlamp 34 is exposed from a front surface of the front cowl 31. A pair of lamp units 40 performing as a turn signal lamp and a position lamp are provided on both left and right sides of the headlamp 34. The vehicle body exterior and the lamps form a streamline that reduces an air resistance received from traveling wind.

Figure 2:
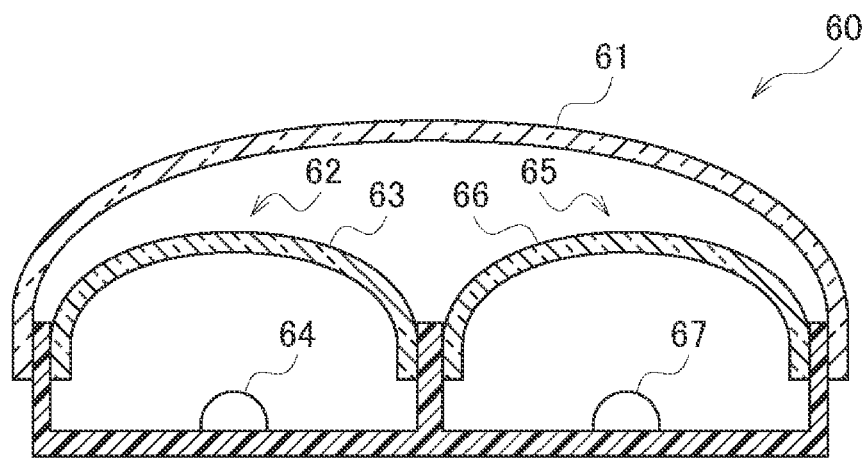
FIG. 2 is a diagram illustrating an irradiation state of a lamp unit according to a comparative example.

As illustrated in the schematic view of FIG. 2, in a lamp unit 60 of the comparative example, a turn signal lamp 62 and a position lamp 65 are installed adjacent to each other inside an outer lens 61. An inner lens 63 of the turn signal lamp 62 and an inner lens 66 of the position lamp 65 partition the inner side of the outer lens 61 for each lamp. The outer lens 61 is illuminated from the inside through the inner lens 63 by an irradiation light from a light source 64 of the turn signal lamp 62, and the outer lens 61 is illuminated from the inside through the inner lens 66 by an irradiation light from a light source 67 of the position lamp 65.

By using large lamps in the lamp unit 60 of the comparative example, a light emitting area of the lamp unit 60 is widened and visibility is improved, but the large lamp increases the size of the lamp unit 60. On the other hand, by using small lamps in the lamp unit 60, the lamp unit 60 is reduced in size, but the light emitting area of the lamp unit 60 is narrowed and the visibility is reduced. Therefore, in the lamp unit 40 of the present example, an inner lens of one of a light source for the turn signal lamp and a light source for the position lamp is disposed in an irradiation range of the other light source, so that both an improvement of the visibility of the lamp unit 40 and compactness are achieved.

Figure 3:
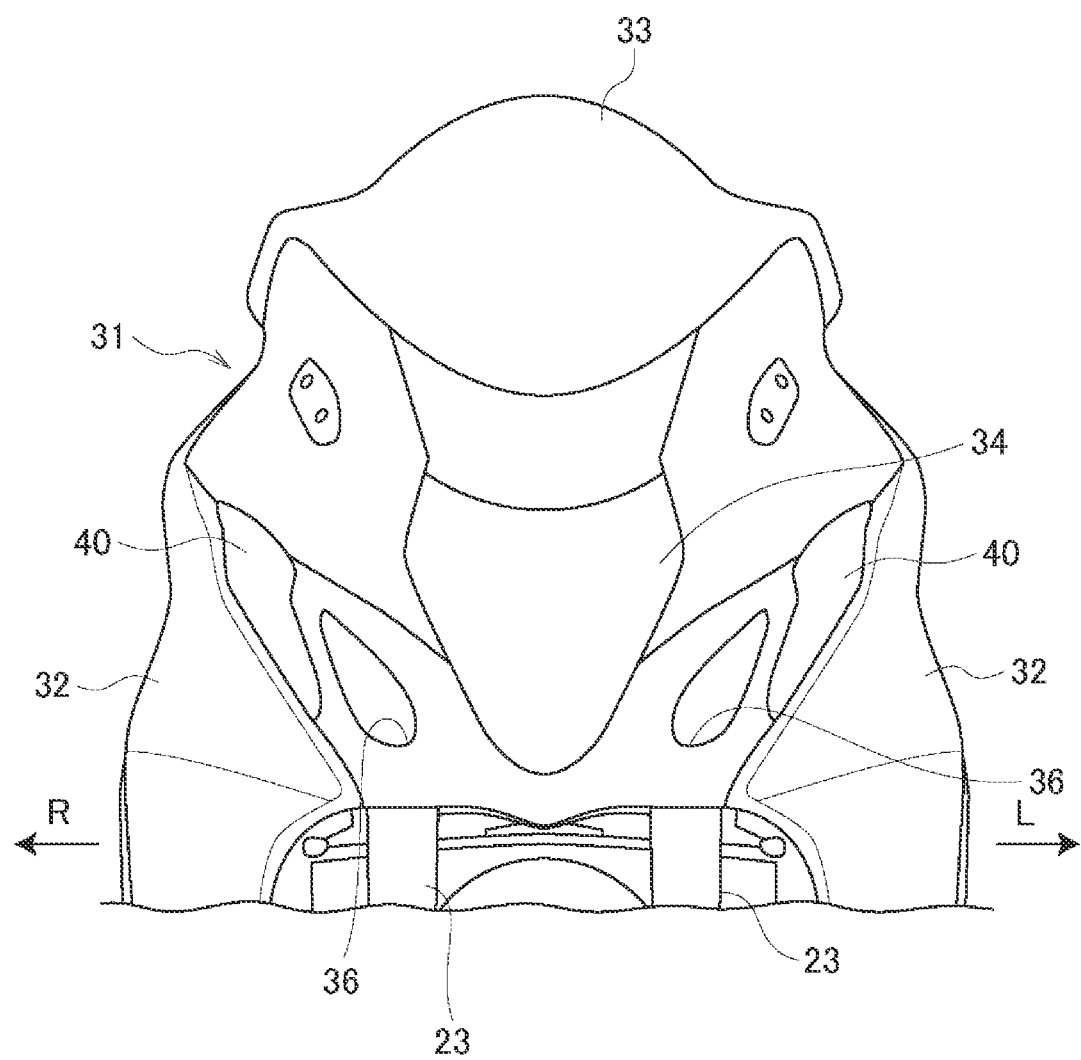
FIG. 3 is a front view of a vehicle front portion according to the present embodiment.
Figure 4:
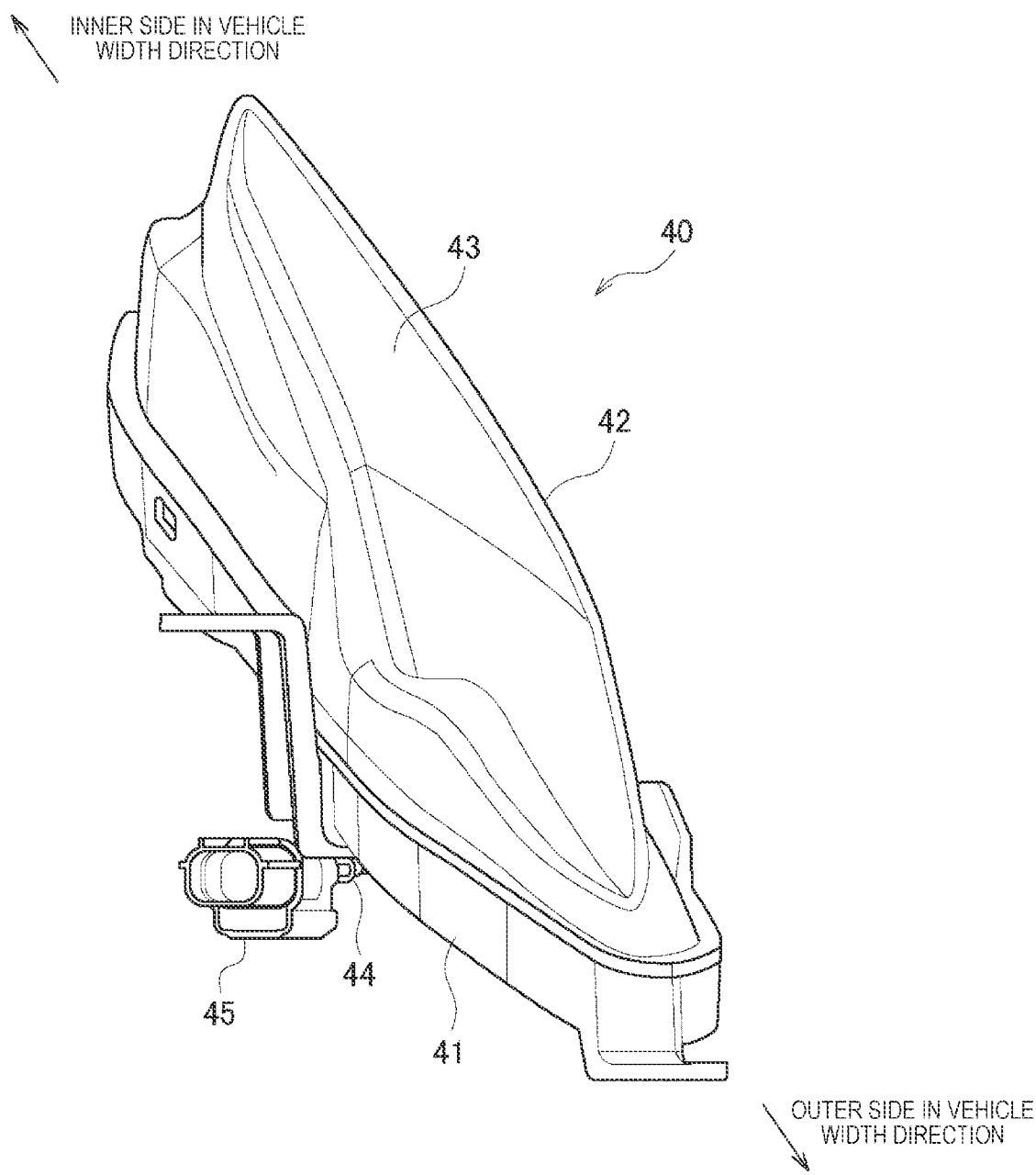
FIG. 4 is a perspective view of a lamp unit according to the present embodiment.
Figure 5:
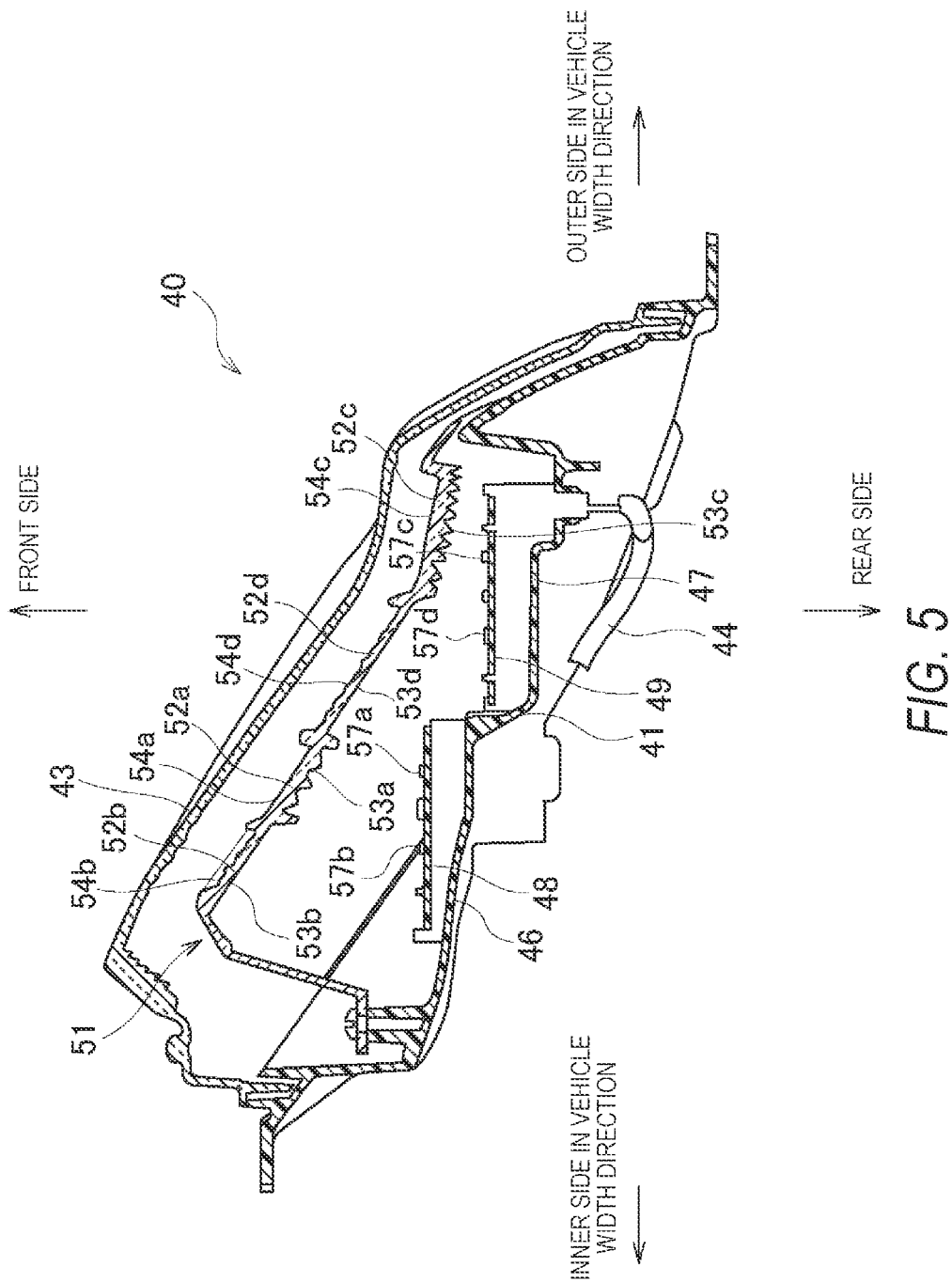
FIG. 5 is a cross-sectional view of the lamp unit according to the present embodiment.
Figure 6:
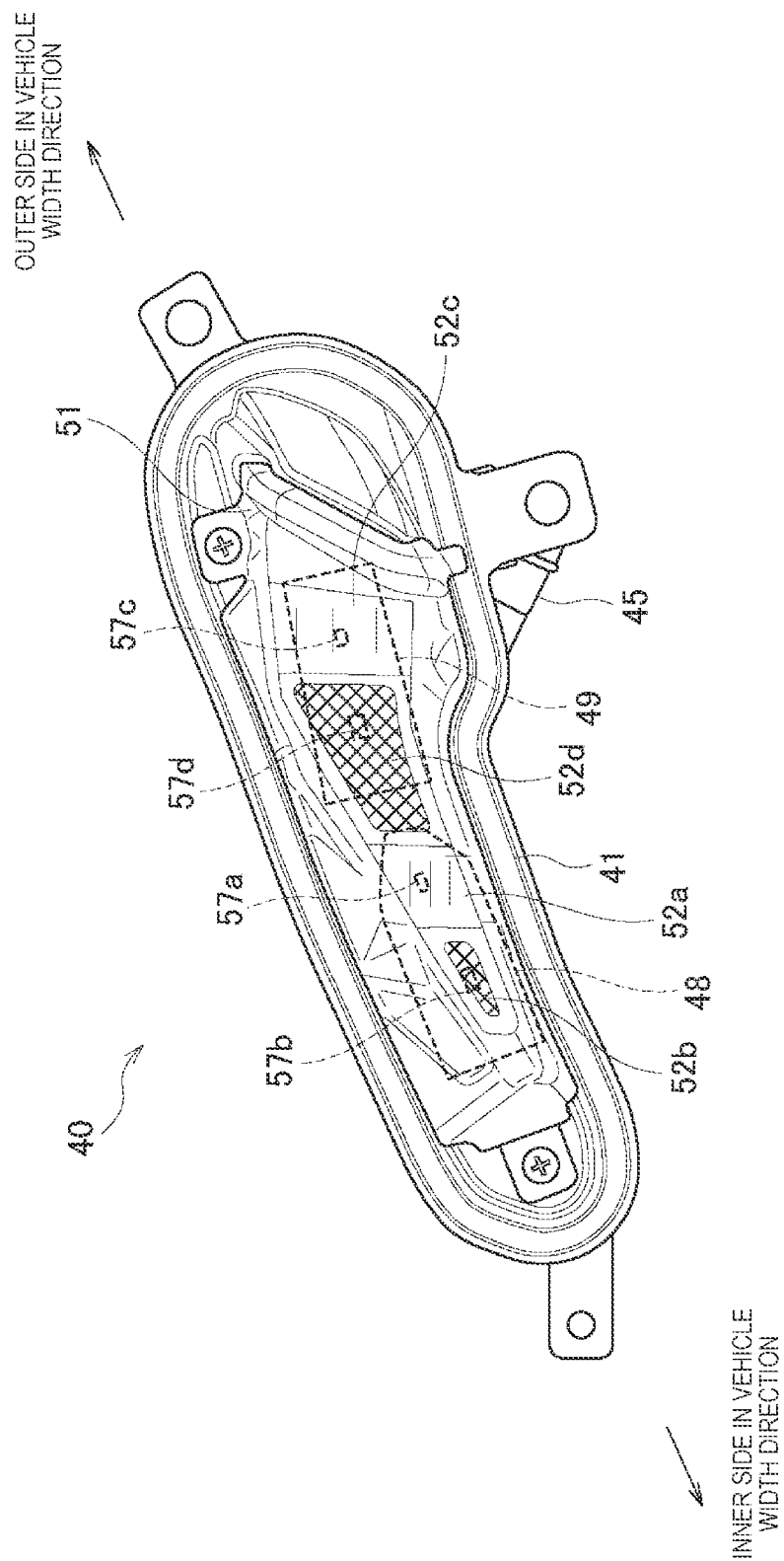
FIG. 6 is a plan view of the lamp unit according to the present embodiment with an outer lens removed.

Hereinafter, the lamp units of the straddle-type vehicle will be described with reference to FIGS. 3 to 6. FIG. 3 is a front view of a vehicle front portion according to the present embodiment. FIG. 4 is a perspective view of the lamp unit according to the present embodiment. FIG. 5 is a cross-sectional view of the lamp unit according to the present embodiment. FIG. 6 is a plan view of the lamp unit according to the present embodiment with an outer lens removed.

As illustrated in FIG. 3, the windbreak screen 33 is provided on the upper portion of the front cowl 31, and the pair of side cowls 32 covering lateral sides of the front forks 23 are provided on a left edge and a right edge of the front cowl 31. The front cowl 31 is formed so as to cover a base end side of the screen 33 and a periphery of the central headlamp 34. The pair of lamp units 40 and openings 36 are formed between the front cowl 31 and the pair of side cowls 32. The lamp unit 40 extends obliquely upward from an inner side in a vehicle width direction toward an outer side in the vehicle width direction in a front view, and extends obliquely upward from the vehicle front side toward the vehicle rear side in a side view (see FIG. 1).

As illustrated in FIG. 4, in the lamp unit 40, an outer lens cover 42 is attached to an opening of a unit case 41. A cord 44 extends from a lower portion of the unit case 41, and a connector 45 is provided at a front end of the cord 44. The outer lens cover 42 bulges in a dome shape, and an inner lens cover 51 (see FIG. 5) and a plurality of light sources 57a to 57d (see FIG. 5) are provided inside the outer lens cover 42. An upper surface of the outer lens cover 42 is an outer lens 43, and the lamp unit 40 is covered with the front cowl 31 (see FIG. 1) in a state where an outer lens 43 is exposed.

As illustrated in FIGS. 5 and 6, a bottom wall of the unit case 41 is formed in a stepped shape, a front portion of the bottom wall on the inner side in the vehicle width direction is a first base portion 46, and a rear portion of the bottom wall on the outer side in the vehicle width direction is a second base portion 47. A first circuit board 48 is fixed to the first base portion 46 via a plurality of bosses, and a second circuit board 49 is fixed to the second base portion 47 via a plurality of bosses. Surfaces of the first and second circuit boards 48, 49 face forward, and the first circuit board 48 is positioned forward than the second circuit board 49. Light sources 57a, 57b are mounted on the surface of the first circuit board 48, and light sources 57c, 57d are mounted on the surface of the second circuit board 49.

The light source (first light source) 57a of the first circuit board 48 and the light source 57c of the second circuit board 49 perform as light sources for the turn signal lamp, and in the present embodiment, amber light emitting diodes (LED) are used as the light sources 57a, 57c. The light source (second light source) 57b of the first circuit board 48 and the light source (third light source) 57d of the second circuit board 49 perform as light sources for the position lamp, and in the present embodiment, white LEDs are used as the light sources 57b, 57d. The lamp unit 40 performs as two types of lamps by switching the light emission of the light sources 57a, 57c and the light sources 57b, 57d.

The inner lens cover 51 is attached to the unit case 41. Inner lenses 52a, 52b are formed on the inner lens cover 51 so as to cover the first circuit board 48, and inner lenses 52c, 52d are formed on the inner lens cover 51 so as to cover the second circuit board 49. An incident surface 53a of the inner lens 52a faces the light source 57a on the surface of the first circuit board 48, and an incident surface 53b of the inner lens 52b faces the light source 57b on the surface of the first circuit board 48. An incident surface 53c of the inner lens 52c faces the light source 57c on the surface of the second circuit board 49, and an incident surface 53d of the inner lens 52d faces the light source 57d on the surface of the second circuit board 49.

The inner lens (first inner lens) 52a and the inner lens (second inner lens) 52b are inclined so as to approach the first circuit board 48 from the inner side in the vehicle width direction toward the outer side in the vehicle width direction. The inner lens 52a is formed to be smaller than an irradiation range of the light source 57a, and the inner lens 52b is formed to be smaller than an irradiation range of the light source 57b. In the inner lens 52a, the incident surface 53a is formed in an uneven shape so as to satisfy a luminous intensity condition of the turn signal lamp. In the inner lens 52b, an emission surface 54b is formed in an uneven shape so as to satisfy a luminous intensity condition of the position lamp.

An inner lens 52c and an inner lens (third inner lens) 52d are inclined so as to approach the second circuit board 49 from the inner side in the vehicle width direction toward the outer side in the vehicle width direction. The inner lens 52c is formed to be smaller than an irradiation range of the light source 57c, and the inner lens 52d is formed to be smaller than an irradiation range of the light source 57d. In the inner lens 52c, the incident surface 53c is formed in an uneven shape so as to satisfy the luminous intensity condition of the turn signal lamp. In the inner lens 52d, an emission surface 54d is formed in an uneven shape so as to satisfy the luminous intensity condition of the position lamp.

The inner lenses 52a to 52d are connected so as to be inclined from the inner side in the vehicle width direction toward the outer side and the rear side in the vehicle width direction (see FIG. 5). A space inside the inner lens 52a and a space inside the inner lens 52b are continuous, a space inside the inner lens 52c and a space inside the inner lens 52d are continuous, and the space inside the inner lens 52a and the space inside the inner lens 52d are continuous. The spaces inside the inner lenses 52a to 52d are continuous to form a single long space.

As described above, in the lamp unit 40, the opening of the unit case 41 is covered with the outer lens 43, and the inner lenses 52a to 52d are provided inside the outer lens 43. The light sources 57a to 57d are provided inside the inner lenses 52a to 52d, and the outer lens 43 is illuminated from the inside through the inner lenses 52a to 52d by irradiation light of the light sources 57a to 57d. The lamp unit 40 performs as the turn signal lamp by illuminating the outer lens 43 with the irradiation light of the amber color of the light sources 57a, 57c, and the lamp unit 40 performs as the position lamp by illuminating the outer lens 43 with the irradiation light of the white color of the light sources 57b, 57d.

An irradiation range Ra (see FIG. 7A) of the light source 57a includes the incident surface 53b of the inner lens 52b and a part of the incident surface 53d of the inner lens 52d in addition to the incident surface 53a of the inner lens 52a. An irradiation range Rc (see FIG. 7A) of the light source 57c includes the incident surface 53d of the inner lens 52d in addition to the incident surface 53c of the inner lens 52c. An irradiation range Rb (see FIG. 7B) of the light source 57b includes the incident surface 53a of the inner lens 52a and a part of the incident surface 53d of the inner lens 52d in addition to the incident surface 53b of the inner lens 52b. An irradiation range Rd (see FIG. 7B) of the light source 57d includes the incident surface 53a of the inner lens 52a, a part of the incident surface 53b of the inner lens 52b, and a part of the incident surface 53c of the inner lens 52c in addition to the incident surface 53d of the inner lens 52d.

Even when small LEDs are used as the light sources 57a to 57d, the irradiation ranges Ra to Rd of the light sources 57a to 57d are widely ensured, and the visibility is improved. Even when the irradiation ranges Ra to Rd of the light sources 57a to 57d are wider than the incident surfaces 53a to 53d of the inner lenses 52a to 52d, the light intensity condition of the turn signal lamp and the light intensity condition of the position lamp are satisfied.

Figure 7A:
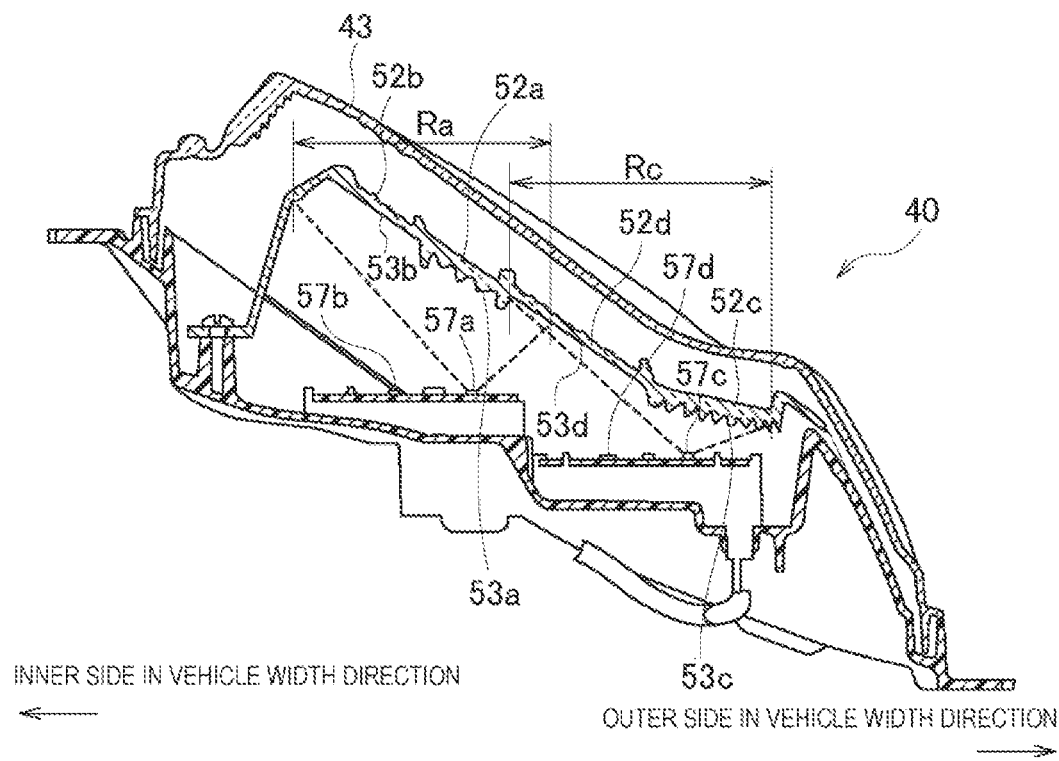
FIGS. 7A and 7B are diagrams illustrating an irradiation state of the lamp unit according to the present embodiment.
Figure 7B:
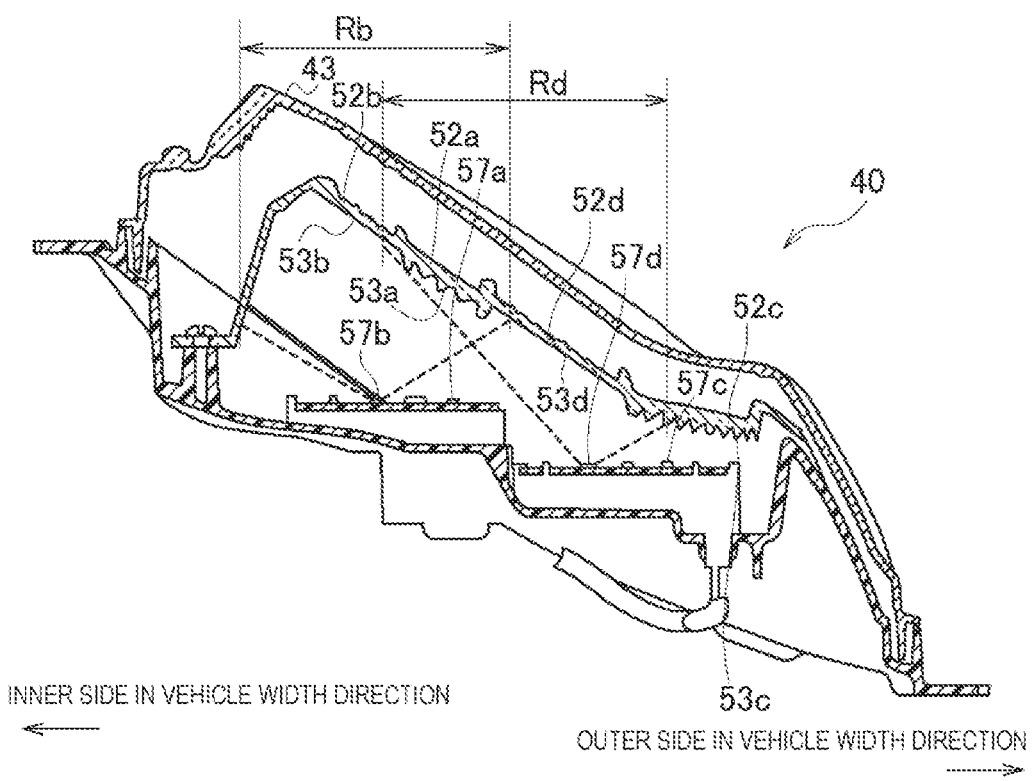

An irradiation state of the lamp unit will be described with reference to FIGS. 7A and 7B. FIGS. 7A and 7B are diagrams illustrating the irradiation state of the lamp unit according to the present embodiment. FIG. 7A illustrates an example of the irradiation state in which the lamp unit performs as the turn signal lamp, and FIG. 7B illustrates an example of the irradiation state in which the lamp unit performs as the position lamp.

As illustrated in FIG. 7A, when the lamp unit 40 is turned on as the turn signal lamp, the light sources 57a, 57c emit light, and the outer lens 43 is illuminated from the inside by the irradiation light of the amber color. The irradiation range Ra of the light source 57a includes an entire area of the incident surface 53a of the inner lens 52a, an entire area of the incident surface 53b of the inner lens 52b, and a part of the incident surface 53d of the inner lens 52d. The irradiation light from the light source 57a is incident on the incident surface 53a of the inner lens 52a, is incident on the incident surface 53b of the inner lens 52b through the space inside the inner lens 52b, and is incident on the incident surface 53d of the inner lens 52d through the space inside the inner lens 52d.

The irradiation light from the light source 57a is incident on the inner lenses 52a, 52b, and 52d, so that the light emitting area of the lamp unit 40 is widened and the visibility is improved. The entire area of the inner lens 52a, the entire area of the inner lens 52b, and a part of the inner lens 52d are illuminated by the light source 57a.

The irradiation range Rc of the light source 57c includes the incident surface 53c of the inner lens 52c and the entire area of the incident surface 53d of the inner lenses 52d. The irradiation light from the light source 57c is incident on the incident surface 53c of the inner lens 52c, and is incident on the incident surface 53d of the inner lens 52d through the space inside the inner lens 52d. The irradiation light from the light source 57c is incident on the entire areas of the inner lenses 52c, 52d, so that the light emitting area of the lamp unit 40 is widened and the visibility is improved.

As illustrated in FIG. 7B, when the lamp unit 40 is turned on as the position lamp, the light sources 57b, 57d emit light, and the outer lens 43 is illuminated from the inside by the irradiation light of the white color. The irradiation range Rb of the light source 57b includes the entire area of the incident surface 53b of the inner lens 52b, the entire area of the incident surface 53a of the inner lens 52a, and the part of the incident surface 53d of the inner lens 52d. The irradiation light from the light source 57b is incident on the incident surface 53b of the inner lens 52b, is incident on the incident surface 53a of the inner lens 52a through the space inside the inner lens 52a, and is incident on the incident surface 53d of the inner lens 52d through the space inside the inner lenses 52a. 52d.

The irradiation light from the light source 57b is incident on the inner lenses 52a, 52b, and 52d, so that the light emitting area of the lamp unit 40 is widened and the visibility is improved. The entire area of the inner lens 52a, the entire area of the inner lens 52b, and a part of the inner lens 52d are illuminated by the light source 57b.

The irradiation range Rd of the light source 57d includes the entire area of the incident surface 53d of the inner lens 52d, the entire area of the incident surface 53a of the inner lens 52a, a part of the incident surface 53b of the inner lens 52b, and a part of the incident surface 53c of the inner lens 52c. The irradiation light from the light source 57d is incident on the incident surface 53d of the inner lens 52d, is incident on the incident surface 53a of the inner lens 52a through the space inside the inner lens 52a, is incident on the incident surface 53b of the inner lens 52b through the spaces inside the inner lenses 52a, 52b, and is incident on the incident surface 53c of the inner lens 52c through the space inside the inner lens 52c.

The irradiation light from the light source 57d is incident on the inner lenses 52a, 52b, 52c, and 52d, so that the light emitting area of the lamp unit 40 is widened and the visibility is improved. The entire areas of the inner lens 52a and the inner lens 52d, a part of the inner lens 52b, and a part of the inner lens 52c are illuminated by the light source 57d.

As described above, according to the present embodiment, since the irradiation light of each of the light sources 57a to 57d is incident on the plurality of inner lenses 52a to 52d, sufficient visibility can be obtained even when each of the light sources 57a to 57d is a small light source such as an LED. Further, even if the size of each of the inner lenses 52a to 52d is reduced, the visibility is ensured by compensating for the shortage of light emitting surfaces of the adjacent inner lenses 52*a* to 52*d*. Therefore, the lamp unit 40 can be compactly formed. Further, by combining the turn signal lamp with the position lamp to form the lamp unit 40, the performs of both the turn signal lamp and the position lamp can be integrated.

In the present embodiment, the light source of the first circuit board on the outer side in the vehicle width direction is the light source for the turn signal lamp, and the light source of the first circuit board on the inner side in the vehicle width direction is the light source for the position lamp, but the light source for the turn signal lamp and the light source for the position lamp may be installed reversely. Similarly, the light source of the second circuit board on the outer side in the vehicle width direction is the light source for the turn signal lamp, and the light source of the second circuit board on the inner side in the vehicle width direction is the light source for the position lamp, but the light source for the turn signal lamp and the light source for the position lamp may be installed reversely.

Further, in the present embodiment, the turn signal lamp and the position lamp are combined to form the lamp unit, but other lamps may be combined to form the lamp unit.

Further, in the present embodiment, two light sources are installed on each of the first and second circuit boards, but all the light sources may be installed on a single circuit board, or each light source may be installed on an individual circuit board. If all the light sources are installed on a single circuit board, costs can be reduced. If individual circuit boards are prepared, the lamp unit can emit light more uniformly.

In the present embodiment, a plurality of inner lenses are formed on the inner lens cover, and the lamp unit includes the inner lens cover, but the lamp unit may individually include a plurality of inner lenses.

Further, in the present embodiment, the LED is exemplified as the light source, but the light source may be configured in any manner as long as the outer lens can be illuminated from the inside. For example, an organic EL or an inorganic EL may be used as the light source.

In the present embodiment, the irradiation range of one of the adjacent light sources includes the inner lens facing the other light source, and the irradiation range of the other light source includes the inner lens facing the one light source, but the irradiation ranges of the light sources are not limited to this configuration. For example, the irradiation range of one of the adjacent light sources includes the inner lens facing the other light source, but the irradiation range of the other light source may not include the inner lens facing the one light source.

In the present embodiment, the irradiation range of the light source includes an entire irradiation surface of the inner lens facing the other light source depending on the light source, but the irradiation range of the light source is not limited to this configuration. For example, the irradiation range of one light source may include a part of the irradiation surface of the inner lens facing the other light source.

Further, the lamp unit according to the present embodiment is not limited to the straddle-type vehicle of a tourer type, and may be adopted by straddle-type vehicles of other types. The straddle-type vehicle is not limited to a general vehicle on which a rider rides at a posture of straddling a seat. Alternatively, the straddle-type vehicle further includes a scooter-type vehicle on which a rider rides without straddling a seat.

As described above, the lamp unit (40) of the present embodiment is a lamp unit in which an opening of the unit case (41) is covered with the outer lens (43), and includes the first inner lens (inner lens 52*a*) provided inside the outer lens; the second inner lens (inner lens 52*b*) provided inside the outer lens; the first light source (light source 57*a*) facing the incident surface (53*a*) of the first inner lens, and the second light source (light source 57*b*) facing the incident surface (53*b*) of the second inner lens, in which the space inside the first inner lens and the space inside the second inner lens are continuous, and at least a part of the incident surface of the second inner lens is disposed in the irradiation range (Ra) of the first light source. According to this configuration, the irradiation light from the first light source is incident on the incident surface of the first inner lens. Further, the irradiation light from the first light source is also incident on the incident surface of the second inner lens facing the second light source through the space inside the second inner lens. Since the first and second inner lenses are illuminated from the inside by the first light source, sufficient visibility can be obtained even if the first light source is small in size. Further, even if a size of the first inner lens is reduced, the visibility is ensured by the second inner lens, and the lamp unit can be compactly formed.

Further, in the lamp unit of the present embodiment, at least a part of the incident surface of the first inner lens is disposed in the irradiation range (Rb) of the second light source. According to this configuration, the irradiation light from the second light source is incident on the incident surface of the second inner lens. Further, the irradiation light from the second light source is also incident on the incident surface of the first inner lens facing the first light source through the space inside the first inner lens. Since the first and second inner lenses are illuminated from the inside by the second light source, sufficient visibility can be obtained even if the second light source is small in size.

Further, in the lamp unit of the present embodiment, the first light source performs as the light source of the turn signal lamp, and the second light source performs as the light source of the position lamp. According to this configuration, the position lamp notifies the surroundings of the presence of the own vehicle, and it is effective if the position lamps are provided on both left and right sides of the vehicle body similarly to the turn signal lamps. Therefore, by combining the turn signal lamp with the position lamp to form the lamp unit, the performs of both the turn signal lamp and the position lamp can be integrated. Further, even if the inner lens for the turn signal lamp is small in size, the visibility of the turn signal lamp is ensured.

Further, the lamp unit of the present embodiment includes the third inner lens (inner lens 52*c*) provided inside the outer lens, and the third light source (light source 57*c*) facing the incident surface (53*c*) of the third inner lens, in which the second inner lens is adjacent to one side of the first inner lens, the space inside the first inner lens and the space inside the second inner lens are continuous, the third inner lens is adjacent to the other side of the first inner lens, the space inside the first inner lens and a space inside the third inner lens are continuous, at least a part of the incident surface of the first inner lens is disposed in the irradiation range of the second light source, and at least a part of the incident surface of the first inner lens is disposed in the irradiation range (Rc) of the third light source. According to this configuration, the irradiation light from the second light source is incident on the incident surface of the second inner lens, and the irradiation light from the third light source is incident on the incident surface of the third inner lens. Further, the irradiation light from the second and third light sources is also incident on the incident surface of the first inner lens facing the first light source. The first inner lens collects the irradiation light from the second and third light sources to improve visibility.

Although the present embodiment has been described, the above-described embodiment and modifications may be combined entirely or partially as another embodiment.

The technique of the present invention is not limited to the above-described embodiment, and various changes, substitutions, and modifications may be made without departing from the spirit of the technical idea of the present invention. The present disclosure may be implemented using other methods as long as the technical concept can be implemented by the methods through advance of the technology or other derivative technology. Accordingly, the claims cover all embodiments that may be included within the scope of the technical concepts.

What is claimed is:

1. A lamp unit, in which an opening of a unit case is covered with an outer lens, the lamp unit comprising:
    a first inner lens provided inside the outer lens;
    a second inner lens provided inside the outer lens;
    a first light source facing an incident surface of the first inner lens; and
    a second light source facing an incident surface of the second inner lens, wherein
    a space inside the first inner lens and a space inside the second inner lens are continuous,
    at least a part of the incident surface of the second inner lens is disposed in an irradiation range of the first light source,
    the first light source is configured to perform as a light source of a turn signal lamp, and
    the second light source is configured to perform as a light source of a position lamp.

2. The lamp unit according to claim 1, wherein
    at least a part of the incident surface of the first inner lens is disposed in an irradiation range of the second light source.

3. A lamp unit, in which an opening of a unit case is covered with an outer lens, the lamp unit comprising:
    a first inner lens provided inside the outer lens;
    a second inner lens provided inside the outer lens;
    a first light source facing an incident surface of the first inner lens;
    a second light source facing an incident surface of the second inner lens;
    a third inner lens provided inside the outer lens; and
    a third light source facing an incident surface of the third inner lens, wherein
    a space inside the first inner lens and a space inside the second inner lens are continuous,
    at least a part of the incident surface of the second inner lens is disposed in an irradiation range of the first light source,
    the second inner lens is adjacent to one side of the first inner lens, and the space inside the first inner lens and the space inside the second inner lens are continuous,
    the third inner lens is adjacent to the other side of the first inner lens, and the space inside the first inner lens and a space inside the third inner lens are continuous, and
    at least a part of the incident surface of the first inner lens is disposed in an irradiation range of the second light source, and at least a part of the incident surface of the first inner lens is disposed in an irradiation range of the third light source.

4. The lamp unit according to claim 3, wherein
    the first light source is configured to perform as a light source of a turn signal lamp,
    the second light source is configured to perform as a light source of a position lamp, and
    the third light source is configured to perform as a light source of the position lamp.

5. A lamp unit, in which an opening of a unit case is covered with an outer lens, the lamp unit comprising:
    a first inner lens provided inside the outer lens;
    a second inner lens provided inside the outer lens;
    a first light source facing an incident surface of the first inner lens; and
    a second light source facing an incident surface of the second inner lens, wherein
    a space inside the first inner lens and a space inside the second inner lens are continuous,
    a surface of a first circuit board on which the first light source is mounted and a surface of a second circuit board on which the second light source is mounted face forward,
    the second circuit board is positioned rearward from the first circuit board, and
    at least a part of the incident surface of the first inner lens is disposed in an irradiation range of the second light source.

6. The lamp unit according to claim 5, wherein
    the first light source is configured to perform as a light source of a turn signal lamp, and
    the second light source is configured to perform as a light source of a position lamp.

* * * * *